Nov. 3, 1931.   W. H. CARMAN ET AL   1,830,348
AUTOMOBILE LICENSE PLATE ATTACHING DEVICE
Filed Dec. 31, 1928
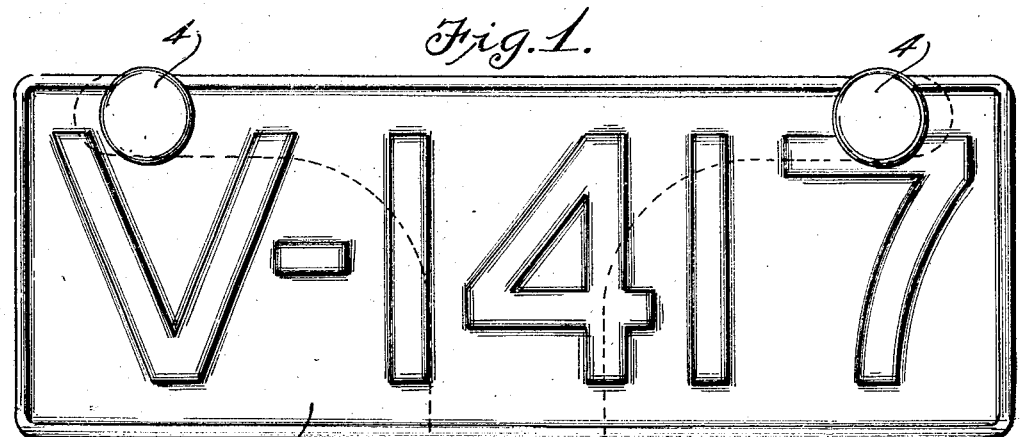
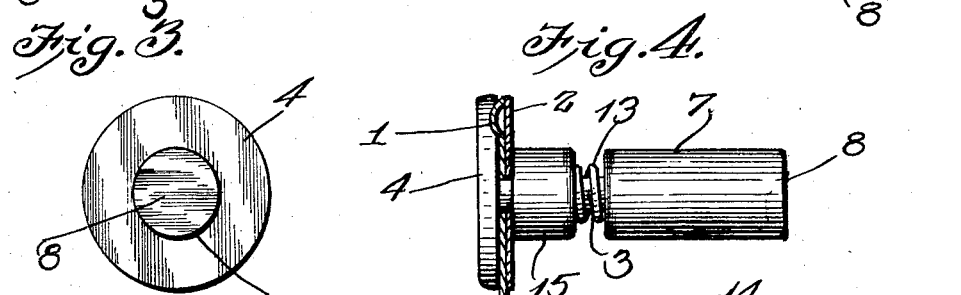
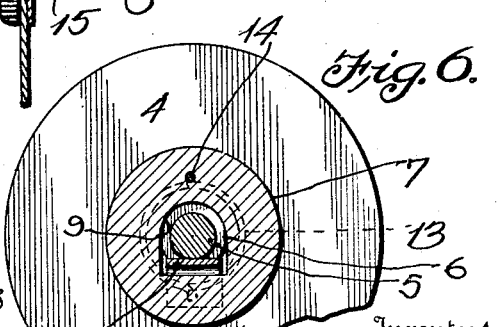
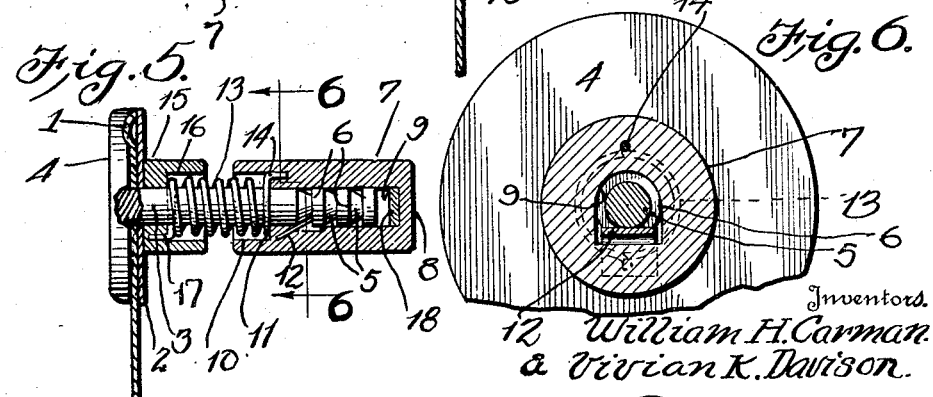
Inventors
William H. Carman
& Vivian K. Davison
By Bryant & Lowry
Attorneys Patented Nov. 3, 1931

1,830,348

UNITED STATES PATENT OFFICE

WILLIAM H. CARMAN AND VIVIAN K. DAVISON, OF SACRAMENTO, CALIFORNIA

AUTOMOBILE LICENSE PLATE ATTACHING DEVICE

Application filed December 31, 1928. Serial No. 329,437.

This invention relates to certain new and useful improvements in automobile license attaching plates, and has for its primary object to provide an attaching device for the above purpose for securely anchoring the license plate in supported position and further being constructed as an anti-rattler.

A further object of the invention is to provide an automobile license plate attaching device comprising a headed bolt and a locking socket for the bolt, a spring element being associated with the socket member, together with pawl and ratchet mechanism to accommodate the mounting of the license plate upon supporting brackets of different thicknesses, both ends of the locking device being closed and permanently interlocked with each other to prevent disengagement and loss of the license plate and necessitating destruction of the locking device to remove the license plate.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view showing an automobile license plate mounted in position upon a supporting bracket by the improved attaching devices;

Figure 2 is a top plan view of the mounted license plate;

Figure 3 is a rear elevational view of one of the attaching devices showing disposed inner ends of the socket member and enlarged bolt head of the cooperating bolt member;

Figure 4 is a side elevational view of the attaching member with the supporting bracket and license plate shown in section;

Figure 5 is a cross-sectional view taken on line 5—5 of Figure 2 showing the notched bolt member of the attaching device locked in the socket member against removal and the tensioned follower having a spring connection with the socket member; and Figure 6 is an enlarged cross-sectional view taken on line 6—6 of Figure 5 showing the ratchet pawl carried by the socket member engaged in a notch formed in the bolt.

Referring more in detail to the accompanying drawings, the automobile license plate attaching device is adapted for permanently anchoring the license plate 1 onto the supporting bracket 2 in a manner to prevent loss thereof, it being necessary to destroy the attaching devices to demount the license plate 1. Each attaching device is composed of a headed bolt member and a socket member, the latter comprising parts attached together to comprise a unit so that the complete attaching device is comprised of two inter-engaging parts.

Each attaching device includes a bolt member having a bolt shank 3 with a relatively large disk head 4 upon one end, the bolt shank 3 being passed through the usual slotted opening in the upper edge of the license plate 1 and to a registering opening in the supporting bracket 2 to receive the socket member in the inner end thereof. As shown in Figure 5, the projecting end of the bolt shank 3 is provided with a series of spaced angular grooves defining tapered surfaces 5 and abutment shoulders 6 for cooperation with a ratchet finger positioned interiorly of the socket member.

The socket member 7 is closed at one end as at 8 and is provided with a socket 9 opening at the other end thereof, the socket 9 being annularly enlarged as at 10 adjacent its open end and defining a shoulder 11. A ratchet finger 12 is anchored at one end interiorly of the socket member 7 with the free projecting end thereof extending into the bore 9 and directed toward the closed end 8 thereof. A coiled spring 13 has one end positioned in the enlarged portion 10 of the bore 9 for engagement with the shoulder 11 with the angularly bent end 14 thereof anchored to the socket member 7 as shown in Figure 5. The other end of the coil spring 6 is associated with a follower nut 15 having one end closed with a central opening therein for the passage of the bolt shank 3, while the opposite end of the follower nut is provided with a socket 16 to receive the other end of the coil spring 13 and has its end 17 anchored in the closed end of the follower nut 15. The attaching device comprises two parts, namely, the headed bolt and the socket member comprising the elements 7 and 15 connected by the spring 13.

In mounting the license plate 1 upon the supporting bracket 2, the bolt shank 3 is passed through the registering openings in the license plate and supporting brackets, with the head 4 disposed in the other side of the license plate as illustrated in Figures 1 and 2, while the bolt shank 3 projects inwardly of the supporting bracket 2 as shown in Figure 5. The socket member is then mounted upon the bolt shank that first passes through the opening in the closed end of the follower nut 15, and also through the coiled spring 13 to enter the socket member 7. The ratchet finger 12 carried by the socket member 7 cooperating with the tapering faces 5 and abutments to rock the socket member upon the bolt shank. The follower nut 15 is moved into engagement with the supporting bracket 2 and the desired tension upon the spring 13 for holding the license plate 1 rigidly mounted is determined by the movement of the socket member 7 toward the follower nut 15 which compresses the spring 13 and urges the follower nut 15 under tension. The inner closed end of the socket member 7 carries a felt washer or gasket 18 that may be engaged with the end of the bolt shank 3 during the mounting of the socket member upon the bolt shank. The ratchet finger 12 permanently secures the attaching device in assembled relation with the license plate permanently mounted upon the supporting bracket 2 against accidental loss or unauthorized displacement, it being understood that it is necessary to destroy the attaching device in order to remove the license plate 1 from the supporting bracket 2.

While there is herein shown and described a preferred embodiment of the present invention, it is nevertheless to be understood that minor changes may be made therein without departing from the spirit and scope of the invention as claimed.

We claim:—

An automobile license plate attaching device comprising a headed bolt having circumferential ratchet grooves therein, a socket member for the bolt including a socket element closed at one end, a coil spring having one end anchored to the socket element, a follower nut to which the other end of the spring is anchored, the bolt being received in the follower nut, spring and socket elements, and a ratchet finger carried by the socket element to engage in the ratchet grooves for permanently connecting the bolt and socket member.

In testimony whereof we affix our signatures.

WILLIAM H. CARMAN.
VIVIAN K. DAVISON.